(12) United States Patent
Barlow et al.

(10) Patent No.: US 7,200,724 B2
(45) Date of Patent: *Apr. 3, 2007

(54) TWO DIMENSIONAL DATA ACCESS IN A PROCESSOR

(75) Inventors: Stephen Barlow, Cambridge (GB); Neil Bailey, Cambridge (GB); Timothy Ramsdale, Cambridge (GB); David Plowman, Saffron Walder (GB); Robert Swann, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/333,574

(22) Filed: Jan. 17, 2006

(65) Prior Publication Data

US 2006/0155925 A1    Jul. 13, 2006

Related U.S. Application Data

(63) Continuation of application No. 10/284,164, filed on Oct. 31, 2002, now Pat. No. 7,080,216.

(30) Foreign Application Priority Data

Oct. 31, 2002   (GB) ................................. 0126141.1

(51) Int. Cl.
*G06F 12/00* (2006.01)

(52) U.S. Cl. ...................... 711/154; 711/100; 711/109; 712/4; 712/7

(58) Field of Classification Search ................. 711/154
See application file for complete search history.

(56) References Cited

U.S. PATENT DOCUMENTS

| | | | | |
|---|---|---|---|---|
| 4,287,571 A | * | 9/1981 | Chakravarti et al. | ........ 365/104 |
| 4,667,308 A | * | 5/1987 | Hayes et al. | ........... 365/230.02 |
| 5,075,889 A | * | 12/1991 | Jousselin et al. | ............. 365/73 |
| 5,313,644 A | * | 5/1994 | Matsuo et al. | ............... 712/228 |
| 5,404,448 A | * | 4/1995 | Bowen et al. | ............... 345/544 |
| 5,623,650 A | * | 4/1997 | Beard et al. | ................. 712/234 |
| 5,696,947 A | * | 12/1997 | Johns et al. | ................. 345/537 |
| 5,712,500 A | * | 1/1998 | Hsue et al. | .................. 257/315 |
| 5,848,020 A | * | 12/1998 | Mori | ..................... 365/230.06 |
| 6,034,911 A | * | 3/2000 | Aimoto et al. | ......... 365/230.03 |
| 6,067,632 A | * | 5/2000 | Yamaguchi | ................. 713/600 |
| 6,172,687 B1 | * | 1/2001 | Kitamura et al. | ........... 345/564 |

* cited by examiner

*Primary Examiner*—Brian R. Peugh
*Assistant Examiner*—Matthew Bradley
(74) *Attorney, Agent, or Firm*—McAndrews, Held & Malloy Ltd.

(57) ABSTRACT

A data processor comprising: a register memory comprising an array of memory cells extending in two dimensions, the cells being located on rows in the first dimension and columns in the second dimension, each cell being addressable by means of an instruction specifying a pair of coordinates that identify the row and column of the cell in the array; and a processing unit capable of executing instructions that operate on a plurality of memory cells in the register, the instructions identifying the plurality of cells by means of a first instruction part specifying a pair of coordinates that identify a first cell in the array, and a second instruction part that identifies the configuration of the plurality of cells relative to the first cell; the data processor being arranged to interpret a first form of second instruction part as specifying a first group of cells all of which are located in the same row but in different columns, and to interpret a second form of second instruction part as specifying a first group of cells all of which are located in the same column but in different rows.

17 Claims, 7 Drawing Sheets

TWO DIMENSIONAL DATA ACCESS IN A PROCESSOR

CROSS-REFERENCE TO RELATED APPLICATIONS

This application is a continuation of U.S. application Ser. No. 10/284,164 filed Oct. 31, 2002 now U.S. Pat. No. 7,080,216.

This invention relates to processors and methods for processing data, for instance video data.

Video data is increasingly being transmitted in a compressed digital form. To achieve this processing must take place to encode the video data at a transmitter and then to decode it at a receiver. To allow a high definition video stream to be transmitted, it is highly desirable for the processing to be as fast as possible.

Many of the operations that are performed to encode or decode video data are in effect performed on matrices of data. For example, in encoding video data it may be necessary to compare part of one video frame with an earlier video frame to determine whether the part can be matched to any of the earlier frame. The video frame data can effectively be considered as matrices of data representing pixel values. Such matrices may include a large amount of data, and processing data of this form can be greatly time consuming for conventional data processors. There is therefore a need for a way to improve the speed of processing of such data.

Similar operations may have to be performed for other applications than video processing, for example data encryption.

According to one aspect of the present invention there is provided a data processor comprising: a register memory comprising an array of memory cells extending in two dimensions, the cells being located on rows in the first dimension and columns in the second dimension, each cell being addressable by means of an instruction specifying a pair of coordinates that identify the row and column of the cell in the array; and a processing unit capable of executing instructions that operate on a plurality of memory cells in the register, the instructions identifying the plurality of cells by means of a first instruction part specifying a pair of coordinates that identify a first cell in the array, and a second instruction part that identifies the configuration of the plurality of cells relative to the first cell; the data processor being arranged to interpret a first form of second instruction part as specifying a first group of cells all of which are located in the same row but in different columns, and to interpret a second form of second instruction part as specifying a first group of cells all of which are located in the same column but in different rows.

Preferred aspects of the invention are set out in the following description and in the dependant claims.

The present invention will now be described by way of example with reference to the accompanying drawings, in which.

Figure 1:
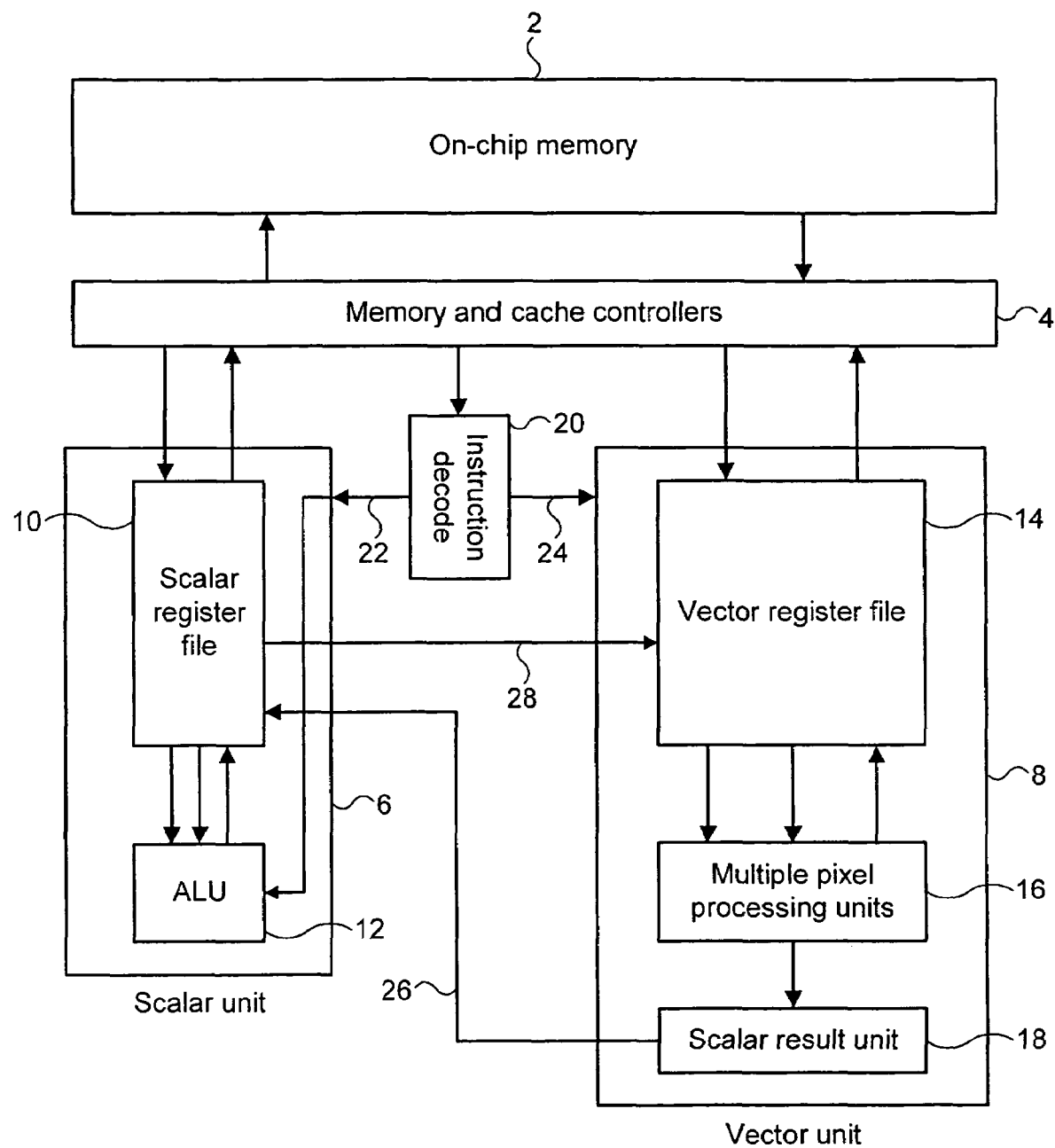
FIG. 1 is a schematic block diagram of the processor architecture.

FIG. 1 is a schematic block diagram of a data processor in accordance with one embodiment of the invention. An on-chip memory 2 holds instructions and data for operation of the processor. Memory and cache controllers denoted generally by a block 4 control communication of instructions and data from the on-chip memory with the two main processing units of the processor. The first main processing unit 6 is a scalar unit and the second main processing unit 8 is a vector unit. The construction and operation of these units will be described in more detail in the following. In brief, the scalar unit 6 comprises a scalar register file 10 and an ALU processing block 12. The vector unit 8 comprises a vector register file 14, a plurality of pixel processing units (PPU) denoted generally by a block 16 and scalar result unit 18. An instruction decoder 20 receives a stream of instructions from the on-chip memory 2 via the memory and cache controllers 4. As will be discussed in more detail hereinafter, the instruction stream comprises distinct scalar and vector instructions which are sorted by the instruction decoder 20 and supplied along respective instruction paths 22, 24 to the scalar unit and to the vector unit depending on the instruction encoding. The results generated by the vector unit, in particular in the scalar result unit 18, are available to the scalar register file as denoted by arrow 26. The contents of the scalar register file are available to the vector register file as indicated diagrammatically by arrow 28. The mechanism by which this takes place is discussed later.

FIG. 1 is a schematic view only, as will be apparent from the more detailed discussion which follows. In particular, the processor includes an instruction cache and a data cache which are not shown in FIG. 1 but which are shown in subsequent figures.

Before discussing the detail of the processor architecture, the principles by which it operates will be explained.

The scalar and vector units 6, 8 share a single instruction space with distinct scalar and vector instruction encodings. This allows both units to share a single instruction pipeline, effectively residing in the instruction decoder 20 (implemented as a control and instruction decode module). Instructions are dispatched sequentially to either the scalar unit 6 or to the vector unit 8, depending on their encodings, where they run to completion as single atomic units. That is, the control and instruction decode module 20 waits for the previous instruction to complete before issuing a new instruction, even if the relevant unit is available to execute the new instruction.

The scalar unit 6 and vector unit 8 operate independently. However, communication between the two units is available because of the following two facets of the processor architecture. Both units can read and write data in the main on-chip memory 2. In addition, the vector unit can use registers in the register file 10, immediate values (fixed values defined in an instruction) and main memory accesses using values held in the scalar register file 10. The result of a vector operation in the vector unit 8 can then be written back into one of these scalar registers from the scalar result unit 18.

Figure 2:
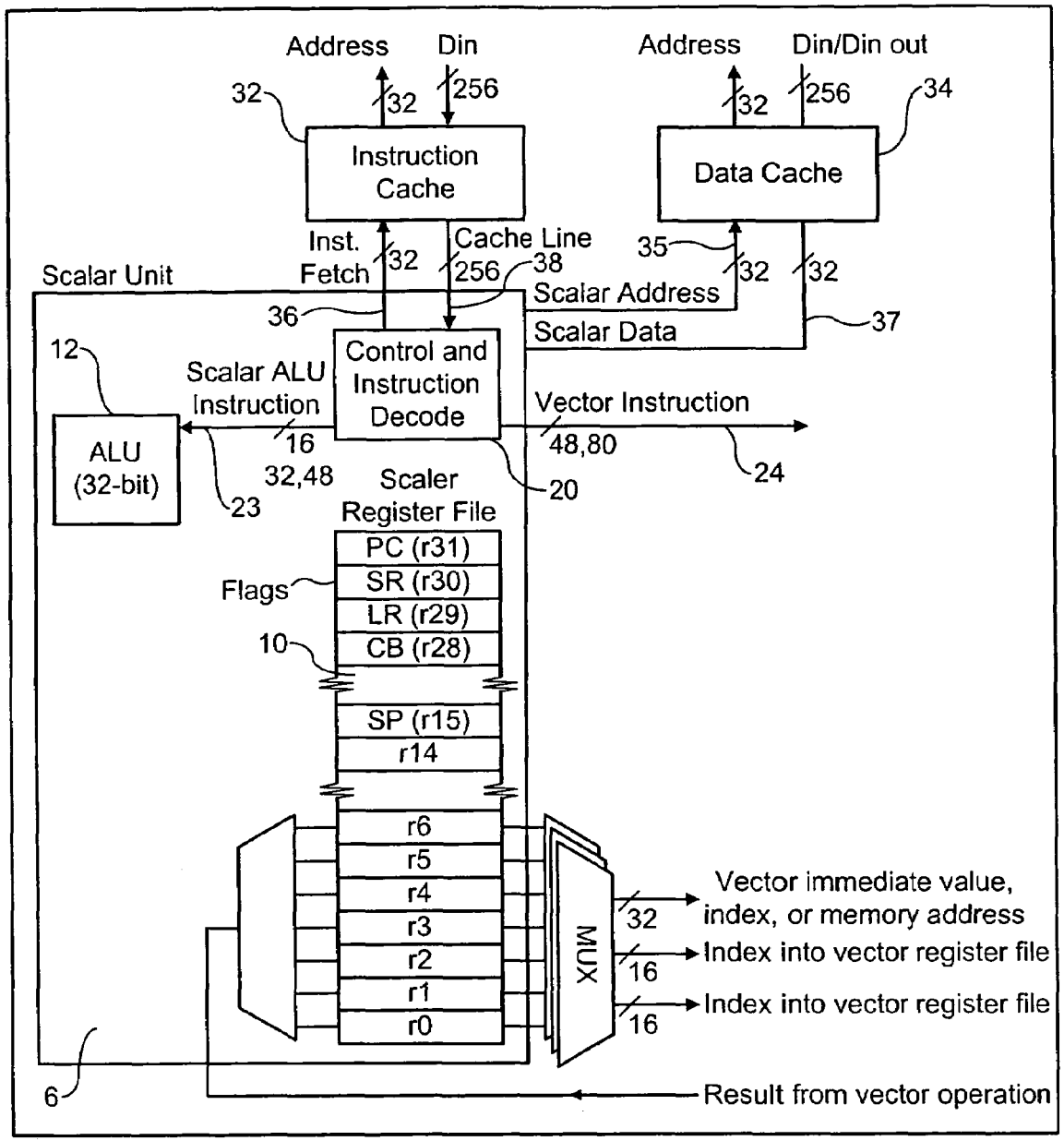
FIG. 2 is a schematic diagram of the scalar unit.

The scalar unit will now be described with reference to FIG. 2. As mentioned above, the instruction decoder 20 is implemented as a control and instruction decode module. The scalar unit communicates with an instruction cache 32 and a data cache 34 in a conventional fashion. In particular, the control and instruction decode module 20 issues instruction fetches along bus 36 and receives instructions along instruction cache line 38. A 256-bit sequence is received along cache line 38 for each instruction fetch, the number of instructions in each fetch depending on their encodings. Scalar addresses are supplied to the data cache 34 via bus 35 and data returned along bus 37. The control and instruction decode module 20 can be considered to supply scalar instructions along paths 23, 25 to the SRF 10 and ALU block 12 and vector instructions to the vector unit 8 along instruction path 24. The decision as to where to route an instruction is based on the instruction encodings as will be discussed in more detail in the following.

As a practical matter, the instruction decode unit 20 decodes the incoming instruction and sets a large number of control lines according to the instruction received. These control lines spread throughout the rest of the chip. Some of them feed into the scalar unit (some (23) to the scalar register file, some (25) to the scalar ALU). These lines are used when the instruction received was a scalar one.

Other lines feed into the vector unit 8 along path 24. These are distributed so that some lines feed to the vector register file 14, some to the PPUs 16 and so forth. These are used when the instruction was a vector one. In the case of the PPUs, there are six control lines feeding identically from the instruction decode unit 20 into each of the 16 PPUs. In fact, these lines are set directly from the "opcode bits" in the vector instruction (discussed later).

Each PPU will individually examine these six control lines and perform a single operation on its inputs according to the current setting. Each of the 64 possible settings represents a singly specific instruction (though not all are currently used). A similar arrangement exists for the scalar ALU. When a scalar instruction is received, the instruction decode unit finds the correct "opcode bits" in the instruction and passes them along the control lines that run to the scalar ALU.

The scalar unit 6 also incorporates a scalar register file. There are thirty two 32-bit registers which are labelled $r_0 \ldots r_{31}$ in the scalar register file 10. The bottom sixteen registers $r_0$ to $r_{15}$ form the main working registers of the processor, accessible by all but a few specialised instructions. A subset of these working registers, the so-called core registers labelled $r_0$ to $r_6$, are available to the vector unit 8. These registers can be used to hold an immediate value, as an index into the vector register file, as an address for vector memory accesses or for storing results of vector operations.

The function of the other registers is not material to the present invention and is therefore not discussed further herein. It is however pointed out that one of the registers, $r_{31}$ constitutes the program counter which points to the address of the current instruction and thus is used to control instruction fetches.

Figure 3:
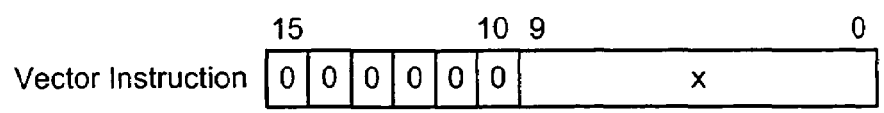
FIG. 3 illustrates bits 0 to 15 of a vector instruction.

The processor's instruction set includes scalar instructions and vector instructions. The scalar instructions are for execution by the scalar unit. The vector instructions are for execution by the vector unit. FIG. 3 illustrates bits 0 to 16 of a vector instruction. Of particular importance, it is to be noted that the 6 bit sequence 000000 in bits 10 to 15 of the instruction indicate that the instruction is not a scalar instruction but is in fact a vector instruction. This allows the instruction decoder 20 to distinguish between scalar instructions and vector instructions.

The vector unit 8 will now be described with reference to FIG. 4. The vector unit comprises sixteen 16-bit pixel processing units $PPU_0 \ldots PPU_{15}$ which operate in parallel on two sets of sixteen values. These sets of values can be retrieved as packed operands from the vector register file 14, from the scalar register file 10 or from the main memory 2. The results of the PPU operations are handled as described later.

The vector register file 8 is arranged as an orthogonal 64 by 64 square matrix. Each of the 4096 cells of the matrix can hold a respective 8-bit byte of data. Several specific vector instructions are provided. These can be used to instruct the vector processor to perform operations on the data in the vector register. Data can be read from the vector register file as 8- or 16-bit values, in parallel and in a variety of different formats.

Data in the vector register file can be accessed by means of vector instructions. The instructions provide the facility to conveniently treat certain forms of contiguous cells of the vector register file as individual registers.

Horizontal and Vertical 8-Bit Access

Figure 5:
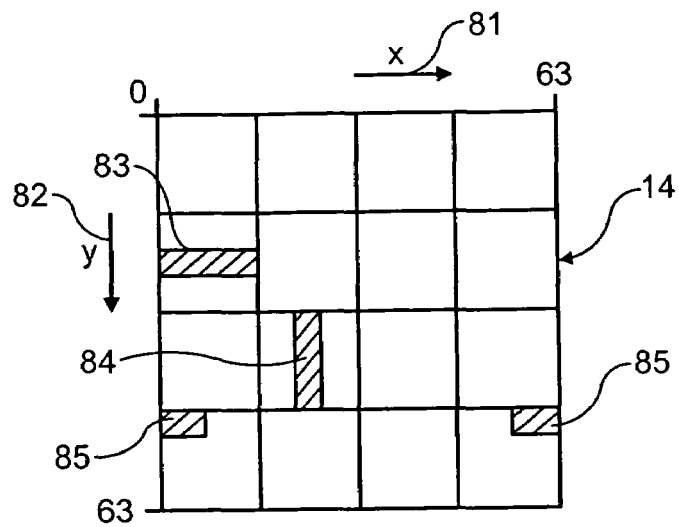
FIG. 5 illustrates horizontal and vertical 8-bit addressing of a vector register file.

FIG. 5 shows the vector register file 14 represented as a 64 by 64 array of 8-bit cells extending in a horizontal, or x, direction 80 and a vertical, or y, direction 81. An example of a single 8-bit cell is shown at 82. A single 8-bit cell can be expressed by the expression $P(i,j)$, where i is the coordinate of the cell in the y direction and j is the coordinate of the cell in the x direction.

The vector processor can interpret instructions that specify as operands notional registers whose contents are represented by horizontally or vertically contiguous 8-bit cells of the vector register file.

A register specified in a vector instruction as $H(i,j)$ is represented by the contents of 16 horizontally contiguous 8-bit cells: i.e. $H(i,j)$ equates to $\{P(i,j), P(i,j+1) \ldots P(i,j+15)\}$. Area 83 in FIG. 5 represents the register expressed as $H(23,0)$.

A register specified in a vector instruction as $V(i,j)$ is represented by the contents of 16 vertically contiguous cells: i.e. $V(i,j)$ equates to $\{P(i,j), P(i+1,j) \ldots P(i+15,j)\}$. Area 84 in FIG. 5 represents the register expressed as $V(32,23)$.

This provides a convenient facility by which a programmer can cause the data in horizontally or vertically adjacent cells of the vector register file to be accessed and then operated upon. This feature has significant advantages in video processing, as will be discussed below.

Wrapping

The vector register file is treated by the vector processor as if it wraps horizontally and vertically, so that the cell $P(23,0)$ is treated as being adjacent to and following from cell $P(23, 63)$, and the cell $P(0,23)$ is treated as being adjacent to and following from cell $P(63,23)$. Therefore $P(i,j)$ can in more detail be considered as being represented by $P(i \text{ MOD } 64, j \text{ MOD } 64)$. Area 85 in FIG. 5 represents the register expressed as $H(48,55)$.

Horizontal and Vertical 16-Bit Access

Figure 6:
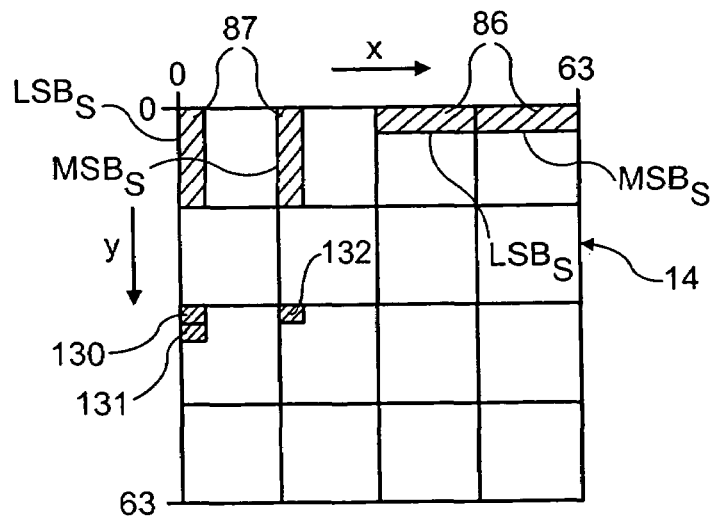
FIG. 6 illustrates horizontal and vertical 16-bit addressing of a vector register file.

In this mode the register file can be treated as a 64 row by 32 column matrix of 16-bit values. Pairs of 8-bit cells vertically offset from each other by 16 cells are treated as single 16-bit cells. FIG. 6 shows the vector register file. A single 16-bit cell can be expressed by the expression PX(i,j), which equates to P(i,j)+256*P(i,j+16). Thus the data at P(i,j) represents the least significant bits of the 16-bit value, and the data at P(i,j+16) represents the most significant bits of the 16-bit value.

The vector processor can interpret instructions that specify as operands notional registers whose contents are represented by horizontally or vertically contiguous 16-bit cells of the vector register file.

A register specified in a vector instruction as HX(i,j) is represented by the contents of 16 horizontally contiguous 8-bit cells together with the 16 8-bit cells offset horizontally from that set by 16 cells: i.e. HX(i,j) equates to {PX(i,j), PX(i,j+1) . . . PX(i,j+15)}. Area 86 in FIG. 6 represents the register expressed as HX(0,32).

A register specified in a vector instruction as VX(i,j) is represented by the contents of 16 vertically contiguous 8-bit cells together with the 16 8-bit cells offset horizontally from that set by 16 cells: i.e. H(i,j) equates to {PX(i,j), PX(i+1,j) . . . PX(i+15,j)}. Area 87 in FIG. 6 represents the register expressed as V(32,23).

Neighbourhood Access

In this mode the register file can be treated as being composed of 8-bit registers whose contents are defined by the least significant bits of the 8-bit cells surrounding the one specified in the access request. A register specified in neighbourhood access mode can be expressed as N(i,j), whose bits are formed as indicated in the following table:

| Bit 7 (MSB) | Bit 6 | Bit 5 | Bit 4 | Bit 3 | Bit 2 | Bit 1 | Bit 0 (LSB) |
|---|---|---|---|---|---|---|---|
| LSB of P(i − 1, j − 1) | LSB of P(i − 1, j) | LSB of P(i − 1, j + 1) | LSB of P(i, j − 1) | LSB of P(i, j + 1) | LSB of P(i + 1, j − 1) | LSB of P(i + 1, j) | LSB of P(i + 1, j + 1) |

Figure 7:
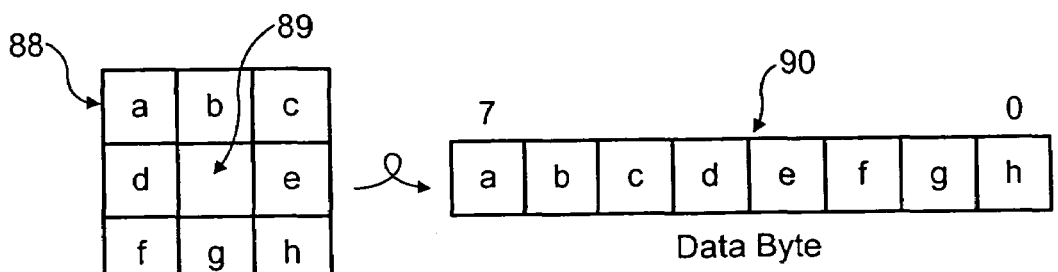
FIG. 7 illustrates neighbourhood addressing of a vector register file.

This arrangement is illustrated in FIG. 7, in which block 88 has 9 8-bit cells surrounding a cell 89 and block 90 has 8 1-bit cells representing the bits of the register returned by neighbourhood access specifying cell 89.

Physical Arrangement of the Vector Register File

Figure 4:
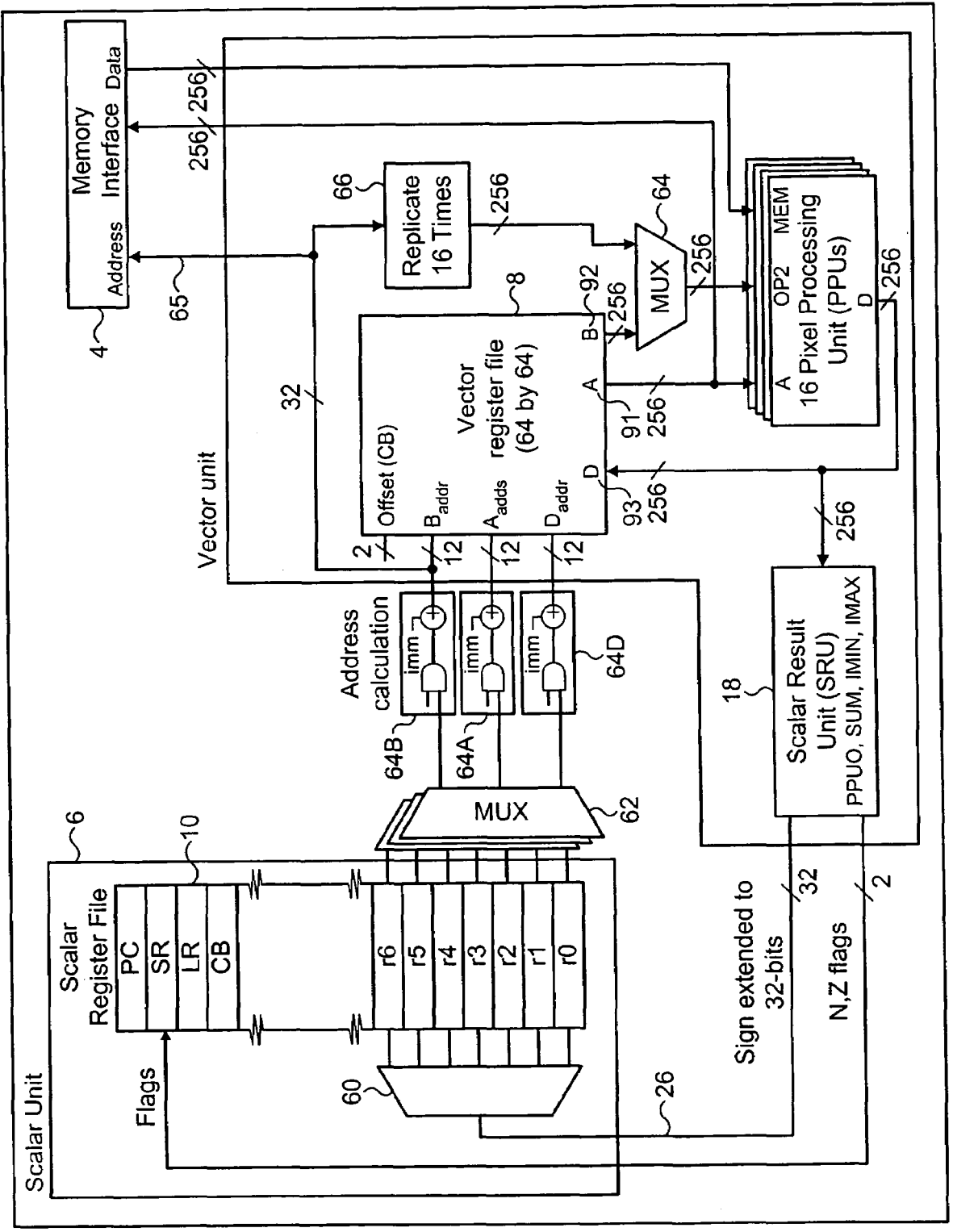
FIG. 4 is a schematic block diagram of a vector unit.

The vector register file has two read ports A (91 in FIG. 4) and B (92 in FIG. 4) and one write port (93 in FIG. 4). Port B and D are responsive to specifications of registers in the forms H(a,b), V(a,b), HX(a,b) and VX(a,b) for reading (at port A) or writing (at port D) data from and to the vector register file in those formats. Port A is responsive to specifications of registers in those forms plus additionally in the form N(a,b).

In principle any arrangement of storage could be used for the vector register file. However, significant speed advantages can be obtained if the vector register file permits direct reading of cells both vertically and horizontally, so that the content of a set of vertically or horizontally adjacent cells can be written directly on to a set of output data lines. One example of a system that allows this is described below. Furthermore, it will be appreciated that there are numerous ways in which this can be accomplished. However, many of these ways will require involve a very great number of inter-cell connections, and when the vector register file is of a large size—such as the 64-by-64 8-bit file of the present example—these ways are likely to make manufacture of the register file very costly. Therefore, it is also preferred that the system can use a relatively small number of connections.

For example, where the file is accessed by means of word and bit lines, each cell is preferably actuable by fewer than four and most preferably by two word lines: and/or the number of word lines is preferably not more than four times or not more than twice the square root of the number of bits in the register file; and/or the number of bit lines is preferably not more than twice or is equal to the square root of the number of bits in the register file. The system described below gives an example of a scheme having these features.

Figure 8:
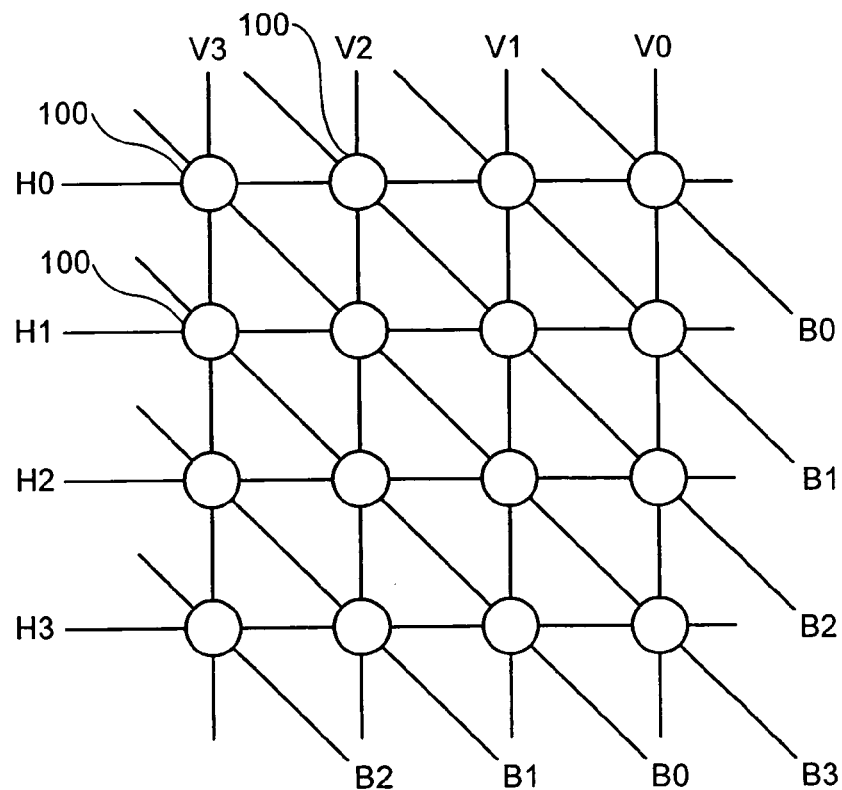
FIG. 8 illustrates the arrangement of word and data lines in a vector register file.

The vector register file of the present example is formed as a memory array of single-bit storage cells, which could, for example, be latches or memory cells. As in a standard memory array the cells are connected by word lines and bit lines. Each word line intersects each data line at a single cell. When a word line is asserted each data line takes on the value of the cell at the intersection of that data line and the asserted word line; or the value of that cell can be changed by changing the value of the data line. In this way the contents of the array can be read or written The vector register file is configured with its storage cells 100 in an orthogonal array, arranged with the cells located at the intersections of orthogonal rows and columns as shown in FIG. 8. The vector register file has two sets of word lines: a horizontal set (H0, H1, H2, H3) which run along the rows and a vertical set (V0, V1, V2, V3) which run along the columns. Each word line comprises a pairing of a read line (HR, VR) and a write line (HW, VW). Every storage cell lies on a single vertical word line (comprising a pairing of read and write lines VR, VW) and a single horizontal word line (comprising a pairing of read and write lines HR, HW). The vector register file has a single set of bit lines (B0, B1, B2, B3). Each bit line comprises a pairing of a read line (BR) and a write line (BW). The bit lines run diagonally with respect to the horizontal and vertical word lines, so that adjacent cells on a single bit line are located on adjacent horizontal and vertical word lines. Some of the data lines are split as they wrap around the top/bottom of the array. The two parts of each line are connected together (not shown in FIG. 8).

FIG. 8 shows only a 4-by-4 array of cells. The same principle is used on a larger scale in the 64-by-64 vector register file, which would have 64 horizontal word lines, 64 vertical word lines and 64 diagonal wrapped bit lines.

Figure 9:
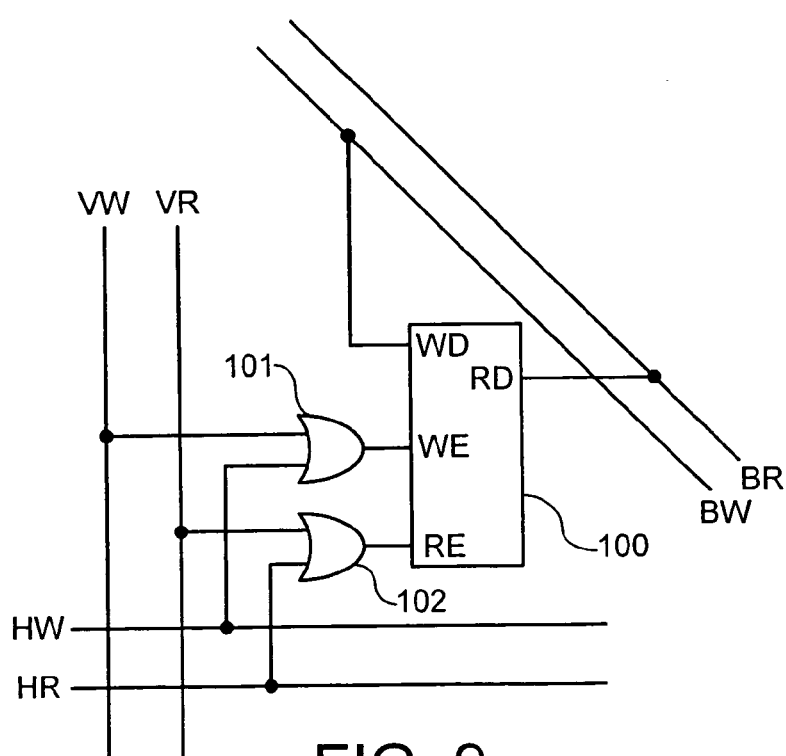
FIG. 9 illustrates a memory cell for a vector register file.

FIG. 9 shows one of the memory cells 100 in more detail. The cell is located at the intersection of a vertical word line comprising read and write lines VW, VR; a horizontal word line comprising read and write lines HW, HR; and a bit line comprising read and write lines BW, BR. The cell has a write enable input WE, a read enable input RE, a read data output RD and a write data input WD. The write enable input is connected to write lines HW, VW via an OR gate 101 which is arranged so that the write enable input is activated when HW or VW is activated. The read enable input is connected to write lines HR, VR via an OR gate 102 which is arranged so that the write enable input is activated when HR or VR is activated. The cell is arranged so that when the read enable input is activated the content of the cell (a 1 or a 0) is output via the read data output to the read line BR, and so that when the write enable input is activated the content of the cell takes on the value of the write line BW via the write data input.

To read or write horizontal or vertical data, one of the word lines H0-3 or V0-3 is asserted to activate reading of the cells on that line. The data is read from those cells by being placed onto the appropriate data line. The fact that the bit lines run diagonally to the word lines means that data can be read directly on to the bit lines from cells that are connected vertically or horizontally. It should be noted that the left-most bit of data on the bit line will not necessarily be the left-most or uppermost bit of data on the activated word line. The output data may in effect be rotated when read directly. This does not matter when data is written and then read in the same plane (i.e. using rows only or using columns only) as data will be read out from the same positions as it was written to, so the order will be preserved. However, this configuration cannot be used to transpose data. If data is written to the horizontal port, and read from the vertical port, the data read will not be the columns of the original data. To correct this a shifter is preferably added onto the read and write data lines, or on to the bit lines, so that data is always shifted into the correct place when being written or read. The shifter would be operable in response to the index number of the word line that is activated, to cause corresponding shifting of the bits on the appropriate lines. It should be noted that by configuring the vector register file in this way vertical and horizontal wrap-around addressing of the vector register file can easily be accomplished.

To implement a memory in which each byte is represented by a number of bits—for example 8 bits, each single bit storage cell in the diagonal array can be replaced by that number (e.g. 8) of single-bit storage cells. In the case of 8-bit bytes those cells can be numbered from cell 0 to cell 7. The bit-read and bit-write lines (BR and BW) are then each replaced by 8 parallel lines: BR0–BR7 and BW0–BW7, each connected to one of the 8 1-bit storage cells (BRi is connected to cell i, and so forth). Finally, the read-enable on all of the eight 1-bit cells is driven from the same single signal, namely the output from OR-gate 102. Similarly, all eight write-able lines are driven from OR-gate 101. Now, instead of reading/writing a row/column of bits, the system can read/write a row/column of 8-bit bytes.

Pixel Processing Units

Figure 11:
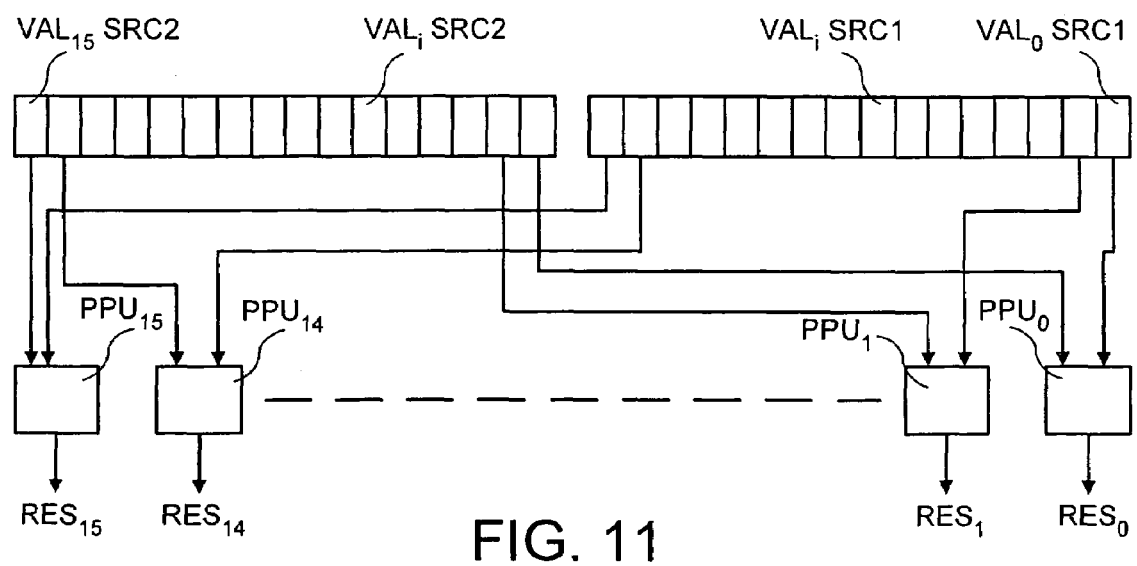
FIG. 11 illustrates parallel operation of pixel processing units.

As illustrated in FIG. 11, each pixel processing unit PPUi acts on two values. When the processor is a graphics processor, each value relates to a pixel. The vector instructions supply two operands to the pixel processing unit. These are labelled SRC1, denoting a first packed operand and SRC2, denoting a second packed operand in FIG. 5. Each operand comprises a plurality of values, in the described embodiment sixteen 16-bit values. A value from each operand is supplied to each pixel processing unit 16, such that PPUi operates on the ith element of the 16 element factors (operands) that have been processed simultaneously. An individual result is generated by each pixel processing unit, the result being labelled RESi in FIG. 5.

Figure 12:
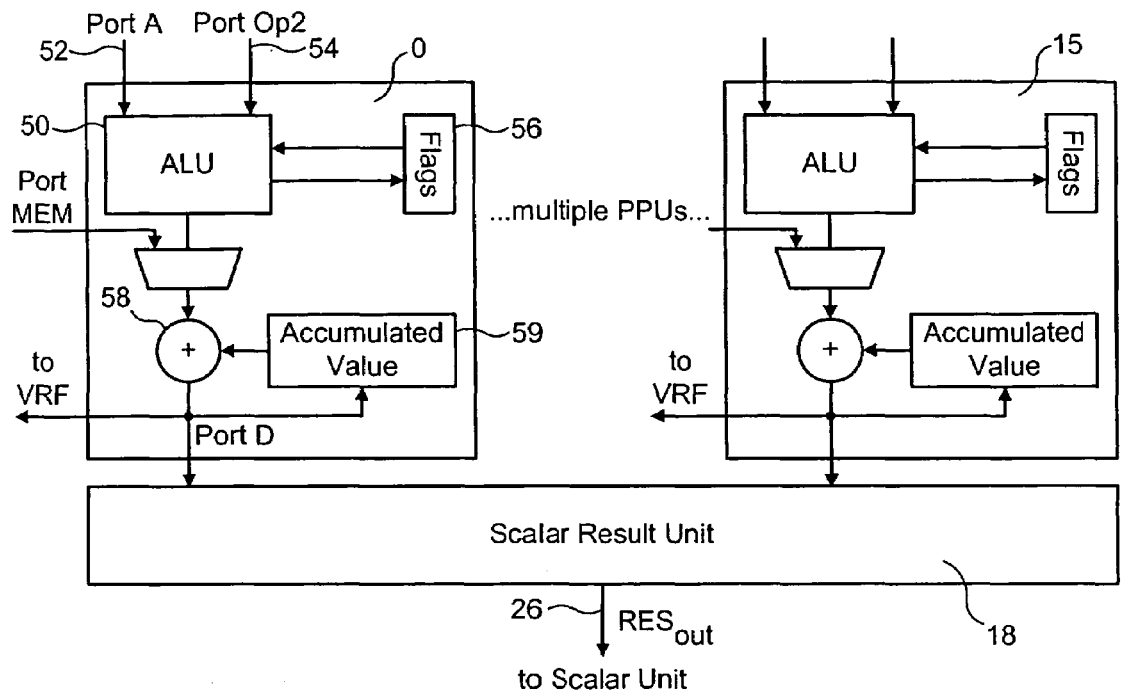
FIG. 12 illustrates the internal circuitry of pixel processing units.

The pixel processing units $PPU_0 \ldots PPU_{15}$ will now be described with reference to FIG. 12. Each of the pixel processing units contains an ALU 50 which operates on two input 16-bit values VAL; SRC1, VAL; SRC2 supplied along paths 52, 54 respectively, to port A and port Op2 to create a single output value $RES_{out}$, according to the operation that has been selected by the vector instruction. Each pixel processing unit 16 has Z, N and C flags denoted generally by the flag block 56. The Z flag denotes a zero flag, the N flag denotes a negative flag and the C flag is a carry flag. The function of these flags is not germane to this invention and is not described further herein. Each pixel processing unit includes an adder 58 and an accumulator 59, which allow the result of the ALU operation to be accumulated and then returned. The thus accumulated value is denoted $V_{acc}$. The output of each pixel processing unit 16 is supplied at port D to the vector register file and to the scalar result unit 18. It will be clear from this that a vector instruction can have two "destinations", one being the VRF where PPU results are returned and the other being the SRF where the result of the SRU operation is returned. In particular, the values that emerge from the PPUs are in essence always fed both back to the VRF and the SRU. There are just a few qualifications, including the possibility that the destination register of a vector instruction my be given as "-" meaning "do not write the result back". In this case, no values are returned to the VRF. The values are still passed on to the SRU as usual, however.

The scalar result unit 18 operates on the outputs of the pixel processing unit 16, depending on the operation defined in the vector instruction supplied to the vector unit. This vale is then written back to the scalar register file 10 in the scalar unit 6 and the scalar flags N, Z are updated according to it. A demultiplexer 60 (FIG. 4) In the scalar unit 6 writes the value to the correct one of the core registers $r_0 \ldots r_6$. Likewise, a set of multiplexers 62 supply the outputs of the core registers $r_0 \ldots r_6$ to the vector register file via address calculation logic 64 according to whether the value is a vector immediate value, index or memory address of 32 bits, or respective 16 bit indices into the vector register file.

Values can be supplied to the pixel processing units 16 in a number of different ways. The use of a 16 bit index creates an address via address calculation logic 64A into the vector register file into the port marked $A_{addr}$. This causes data held in the vector register file to be supplied to the pixel processing units 16 into port A along path 52 in FIGS. 4 and 5. Data can also be accessed from port B by using an index which has created an address for the vector register file into the port marked $B_{addr}$.

This data can be supplied to the port Op2 of the pixel processing unit 16 via a multiplexer 64. Multiplexer 64 also allows for data to be accessed directly from the scalar register file 10 by taking a value held in one of the core registers $r_0 \ldots r_6$ and supplying it through a replicate unit 66, which replicates it 16 times.

An alternative supply of data to the pixel processing unit 16 is directly from on-chip memory 2 via the memory interface 4 (FIG. 4). In this case, an address calculated by address calculation logic 64B is used as an address into main memory along address bus 65, and data access thereby is supplied to port MEM of the pixel processing unit.

The replicate unit 66 can also act on an immediate value in a vector instruction as well as on the contents of a core register in the scalar register file 10.

From this discussion it will be appreciated that the input labelled 54 in FIG. 6 to the pixel processing units can supply either values from the vector register file, values from the scalar register file or values directly from memory to the ALU.

Vector Instructions

With a small number of exceptions, almost all vector instructions have a general three operand form:
<operation>R(yd,xd), R(ya,xa), Op2 [<modifiers>]

where operation is the name of the operation to be performed, and registers in the vector register file are generically denoted R(y,x) due to the addressing semantics of the vector register file. In the above example R(yd,xd) is the destination register, R(ya,xa) is the first source register and Op2 may indicate a second source register R(yb,xb), or a value taken from one of the scalar registers $r_0$ to $r_6$, or an immediate value (these latter two being repeated identically across all sixteen PPUs), as explained above. Finally <modifiers> are selected from an optional list of instruction modifiers which control how the PPUs 16 and the scalar result unit handle the results of the ALU operations in each PPU.

A register R(y,x) can be designated in programming as H(y,x), V(y,x), HX(y,x), VX(y,x) or N(y,x) using the conventions described above. The form of designation that is used must be one that returns a number of bits that is compatible with the instruction that is being invoked.

The vector instructions operate on the pixel processing unit 16 in the following way.

Each of the sixteen pixel processing units is presented with two 16-bit values, one derived from R(ya,xa) and one derived from Op2. (Note that if 8-bit values are read from the vector register file then these are zero extended into 16-bit values.)

Each pixel processing unit performs its operation in accordance with the nature of the operation defined in the instruction. The operation is executed by the ALU 50. If an instruction modifier specifies accumulation of the results, then this takes place. In this case the accumulated values are returned as the final output values of the pixel processing units 16, otherwise the output of the ALU operation is returned as the final output of the pixel processing unit. The scalar result unit 18 performs any calculations indicated by modifiers. The scalar result unit operates on the final outputs from the pixel processing units 16 and the result may be written to one of the scalar registers $r_0$ to $r_6$, and the scalar flags will be set accordingly. The final outputs of the pixel processing units are also written back to the vector register file at port D (in FIGS. 4 and 6).

The vector instruction set can be thought of as being constituted by four types of instructions:
 load/store instructions
 move instruction
 data processing instructions
 look up instructions.

It is to be noted that in writing the program, all vector instructions are preceded by v to denote that they are vector instructions. In the encoding, bits 10 to 15 are set to zero so that the fact that they are vector instructions can be recognised by the instruction decoder. Each instruction type has an 80-bit full encoding, and common types have a compact 48-bit encoding. By way of example, FIG. 6 illustrates the compact 48-bit encoding and full 80-bit encodings for data processing instructions of the following form:
 <operation>R(yd,xd),R(ya,xa),Op2.

Note that all instructions contain six bits to hold opcode identifying the nature of the instruction (bits 3 to 8 of Half-Word 0, labelled I[0] to I[5]). These bits are supplied to each of the PPUs 16. Also note that bit 9 labelled CMPT is a flag which is set to one to indicate a compact 48-bit encoding and zero to indicate the full 80-bit encoding.

The main categories of vector instructions are discussed below.

Load/Store Instructions
Vld R(yd,xd), (rx+#immediate)
 Load sixteen consecutive bytes or sixteen bit half words from memory into the vector register file.

The load instructions identify a destination register in the vector register file and identify a source operand by virtue of its address in main memory. Its address in main memory is calculated from the content of a register rx in the scalar register file 10 using the address calculation logic $64_B$ and the resulting operand is supplied to port MEM.

The store instructions identify a set of operands in the vector register file and cause them to be stored back to memory at an address identified using the contents of a scalar register. The instruction has the following format:
Vst R(ya,xa), (rx+#immediate).

Store sixteen consecutive bytes or half words from the VRF back to memory. The memory address is calculated using the address calculation logic $64_B$ as before.

In both cases, if R(y,x) denotes an 8-bit register, sixteen bytes are stored. If R(y,x) denotes a 16-bit register, half words are stored.

Move Instructions
vmov R(yd,xd), Op2
moves OP2 to R(yd,xd).

In this case, Op2 may be a value from a scalar Register rx, or an immediate value or an immediate value plus the value from a scalar register rx, or a VRF register R(yb,xb) accessed from port B in FIG. 4. In this case therefore there are a number of options for identifying the location of the source value, the destination location being identified in the vector register file.

Data Processing Instructions
 All these instructions take the usual form:
 <operation>R(yd,xd) R(ya,xa) Op2.

A number of different operations can be specified, including addition, subtraction, maximum, minimum, multiply, etc.

Look-up instructions are specialised instructions having the form:
vlookup R (yd,xd)
 These allow the PPU to look up a notional register in the vector register file using one of the forms (H(x,y) etc.) described above.

Use of the Vector Processor
 Some examples of the use of the vector processor will now be described.

A common way to compress a video stream is to rely on the fact that successive video frames often have a significant amount of image data in common, although the image may move relative to the frame boundaries. Recognising such common data is very helpful in reducing the amount of data that must be transmitted in order to render the video stream. To recognise such common data it is useful to compare a block of pixel data from one frame with a block of pixel data from an earlier frame. The block of data from the earlier frame is often larger than the block of data from the later frame. One common form of compression involves comparing a 16-pixel by 16-pixel block of data from a later frame with a larger block (e.g. a 64-pixel by 64-pixel block) of data from an earlier frame.

Figure 10:
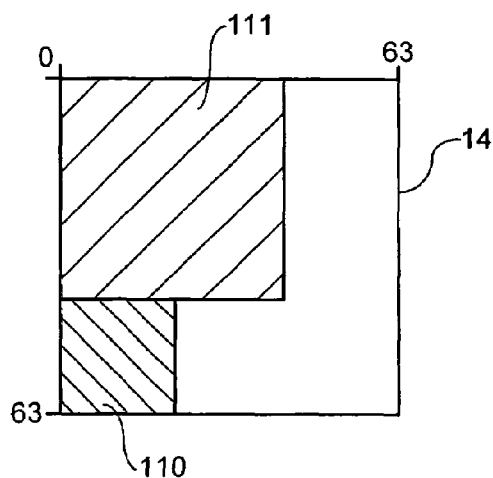
FIG. 10 illustrates a data arrangement for video processing.

FIG. 10 illustrates the contents of the vector register file during an operation to compress video data. In the figure zone 110 is a square zone of 16 8-bit cells by 16 8-bit cells. This zone corresponds to a square block of 16 by 16 pixels in a later frame. An 8-bit value representing the colour and brightness of each pixel in the block is loaded into the corresponding cell in the zone 110. Zone 111 is a square zone of 48 8-bit cells by 48 8-bit cells. This zone corresponds to a square block of 48 by 48 pixels in a later frame. An 8-bit value representing the colour and brightness of each pixel in the block is loaded into the corresponding cell in the zone 111. Each cell in the zones 110 and 111 corresponds to a single respective cell in one of the frames. During the compression operation the data is loaded as described above into the zones 110 and 111. (The remainder of the vector register file can be used to store temporary variables used during the compression operation). Operations are performed by the PPUs to compare the contents of zone 110 with 16-by-16 square sub-zones in zone 111, for example zone 112. Because of the availability of the access modes discussed above, this can be done using a simple set of instructions. One vector instruction is:

vsub R1, R2, R3 where R1 is the register to hold the result, R2 is a first operand register and R3 is a second operand register and each element of the result is determined by subtracting the respective element of R3 from the respective element of R2. Now the single instruction:

vsub H(48,32), H(a,b), H(48,0)

can be used with a and b taking a range of values of to scan for the presence of data from block 110 in block 111.

In mathematical morphology algorithms it is common to process each pixel by analysis of its neighbouring pixels. This type of operation generally works on single bit images. For this type of operation the neighbourhood access mode can conveniently be used.

Figure 13:
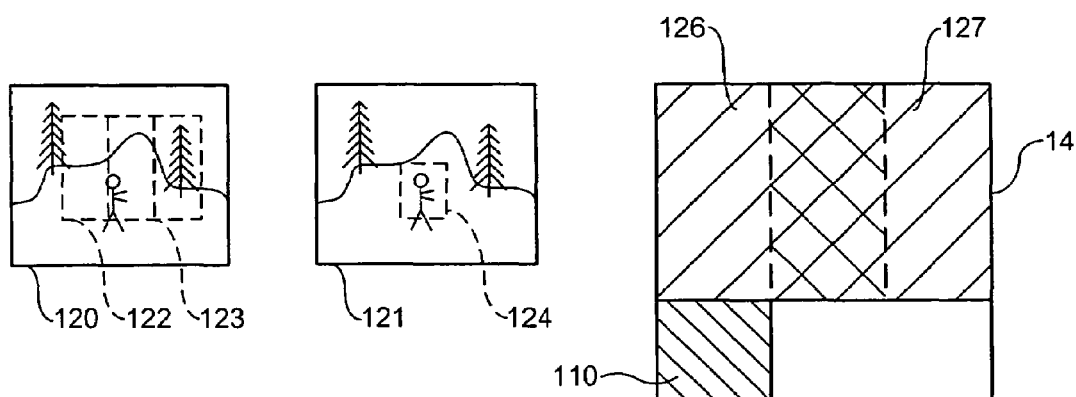
FIG. 13 illustrates video frames and a corresponding data arrangement for video processing.

FIG. 13 shows another convenient use of the vector register file. FIG. 13 shows a first image frame 120 and a subsequent image frame 121. In compressing the data of frame 121 it may be necessary to compare the content of a part 124 of frame 121 with a square block 122 of frame 120 and then with another square block 123 of frame 120, offset horizontally from block 122. Due to the arrangement of the vector register file and the vector processor's instruction set, this can be done very conveniently. Typically the frame data will be stored in memory on or off the chip. The data from block 122 is loaded into a square block 126 of 48-by-48 cells in the vector register file 14. The remaining data from block 123 is also loaded into the vector register file—in a rectangular block of 48-by-16 cells—so that a square 48-by-48 cell block 127 holds the data from block 123. This can be done since blocks 122/123 and 126/127 overlap correspondingly. The data from block 124 can be loaded into block 125 in the vector register file. The data from block 124 can be compared with that of block 126. Then, without re-loading or even moving in the vector register file the information that is common to blocks 122 and 123, the data from block 124 can be compared with that of block 127. This requires fewer fetches of the frame pixel data from main memory than would be needed if each block 122, 123 had to be fetched each time data was to be compared with it. Since addressing of the vector register file wraps around horizontally, this process can be continued by the loading of data from the next block to the left of bock 123 (not shown) into the 48-by-16 cell space in the vector register file formerly occupied by the data that blocks 122 and 123 did not have in common. This makes such comparison operations highly efficient.

Referring to FIG. 6, cells 130 and 131 are in the same register when 8-bit addressing of the form H(a,b) is used. Cells 130 and 132, which are offset horizontally by 16 cells from each other, are in the same register when 16-bit addressing of the form HX(a,b) or VX(a,b) is used. In the 16-bit case cell 130 holds the LSB of a value of which cell 132 is the MSB. This has a number of advantages for programming. First, it means that the 8-bit version of a register (whether H or V) contains the least significant part of the corresponding 16-bit register. So H(a,b) contains the least significant part of HX(a,b). This makes addressing convenient, since a and b are the same in each case. Second, it means that in both HX and VX addressing the most significant 8-bit parts of each value of a register can be addressed using an H or V register so that they can be processed individually.

As another example of the usefulness of the capability to access 16-bit values from the register file, suppose a calculation has been performed which, because of the range of the intermediate values that can be produced, should be done using 16-bit values. This might, for example, result in pixel values in the register defined by HX(0,0). Then these values might have to be replaced into an image stored in memory. This can be done, for example, with the instruction:

vst H(0,0), (r0).

In this case the combining of non-adjacent bytes means we can easily do 16-bit arithmetic, but the non-adjacent arrangement of the low and high halves of the 16-bit values means we can easily recover the 8-bit pixel values H(0,0) that belong in the final image.

As another example of the usefulness of instructions that use both horizontal and vertical registers in image processing it is quite common to transpose an image: i.e. to reflect the image about its diagonal, so that the pixels at (i,j) and (j,i) are swapped. Images are often transposed in tiles: i.e. the image is notionally subdivided into squares (e.g. of 16×16 pixels), and each square is transposed independently; as part of larger image processing or coding algorithms. The availability of horizontal and vertical registers makes transposing an image tile trivial. Suppose the tile is loaded into H(0,0) . . . H(15,0) in the vector register file. The single instruction vmov V(0,16++), H(0++,0) REP 16 will perform the required function (the transposed tile will lie in the register file just to the right of the original tile). The REP 16 suffix of the instruction causes the instruction to be repeated 16 times, with the index values that are suffixed with "++" incremented each time.

The present system is especially suited for video processing, but can be used for other purposes such as data encryption or general data processing.

The applicant draws attention to the fact that the present invention may include any feature or combination of features disclosed herein either implicitly or explicitly or any generalization thereof, without limitation to the scope of any definitions set out above. In view of the foregoing description it will be evident to a person skilled in the art that various modifications may be made within the scope of the invention.

The invention claimed is:

1. A data processor comprising:
   a two dimensional memory array comprising memory cells that are identified by a first dimension and a second dimension, wherein each memory cell comprises an array of single bit storage units;
   a first set of word lines connected to each memory cell located in the first dimension for enabling reading or writing;
   a second set of word lines connected to each memory cell located in the second dimension for enabling reading or writing;
   a set of bit lines running diagonally to the word lines for carrying data to or from the respective memory cell; and
   a processing unit for executing an instruction that operates on a plurality of memory cells, wherein the instruction identifies the plurality of memory cells by identifying a first memory cell in the plurality of memory cells and a configuration of the plurality of memory cells relative to the first memory cell.

2. The data processor as claimed in claim 1, wherein the two dimensional memory array and the processing unit are arranged on the same integrated circuit.

3. The data processor as claimed in claim 1, wherein the array of single bit storage units further comprises a shifter connected to the bit lines arranged for bit-wise shifting of data.

4. A data processor for accessing a two dimensional memory array, the data processor comprising:
- a vector processing unit for executing an instruction that operates on a group of memory cells, wherein the group of memory cells is identified by a first memory cell and a configuration relative to the first memory cell;
- at least a first control line for enabling the vector processing unit to access a row in the group of memory cells;
- at least a second control line for enabling the vector processing unit to access a column in the group of memory cells; and
- at least a third control line for enabling the vector processing unit to access a diagonal in the group of memory cells.

5. The data processor in claim 4, wherein the configuration identifies memory cells that are located in the same row as the first memory cell but in different columns.

6. The data processor in claim 4, wherein the configuration identifies memory cells that are located in the same column as the first memory cell but in different rows.

7. The data processor in claim 4, wherein access to the memory cells allows the vector processing unit to read data from a single-bit storage unit.

8. The data processor in claim 4, wherein access to the memory cells allows the vector processing unit to write data to a single-bit storage unit.

9. The data processor in claim 4, wherein the first control line connects memory cells in the same row, and wherein the second control lines connects memory cells in the same column.

10. The data processor in claim 4, wherein one or more single-bit storage units is a multiple of eight single-bit storage units.

11. The data processor in claim 4, wherein the group of memory cells is a subset of an array comprises 4096 memory cells.

12. An integrated circuit for accessing a two dimensional memory array, the integrated circuit comprising:
- a circuit for a parallel processing an instruction that operates on a group of memory cells in the memory array, wherein the group of memory cells is identified by coordinates of a first memory cell in the memory array and a configuration relative to the first memory cell;
- at least a first control lines for enabling the circuit to access a row in the group of memory cells;
- at least a second control line for enabling the circuit to access a column in the group of memory cells; and
- at least a third control line for enabling the circuit to access a diagonal in the group of memory cells.

13. The integrated circuit in claim 12, wherein the configuration identifies memory cells that are located in the same row as the first memory cell but in different columns.

14. The integrated circuit in claim 12, wherein the configuration identifies memory cells that are located in the same column as the first memory cell but in different rows.

15. The integrated circuit in claim 12, wherein access to the memory allows the circuit to read data from the memory.

16. The integrated circuit in claim 12, wherein access to the memory allows the vector processing unit to write data to the memory.

17. The integrated circuit in claim 12, wherein the first control line connects memory cells in the same row, and wherein the second control lines connects memory cells in the same column.

* * * * *